(12) United States Patent  
Ichikawa

(10) Patent No.: US 12,158,935 B2
(45) Date of Patent: *Dec. 3, 2024

(54) FACIAL AUTHENTICATION APPARATUS AND CONTROL METHOD FOR FACIAL AUTHENTICATION APPARATUS

(71) Applicant: NEC Corporation, Tokyo (JP)

(72) Inventor: Takehiro Ichikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,058

(22) Filed: Dec. 29, 2022

(65) Prior Publication Data

US 2023/0132575 A1 May 4, 2023

Related U.S. Application Data

(63) Continuation of application No. 17/286,637, filed as application No. PCT/JP2019/042754 on Oct. 31, 2019.

(51) Int. Cl.
*H04L 9/40* (2022.01)
*G06F 21/32* (2013.01)
*G06F 21/34* (2013.01)

(52) U.S. Cl.
CPC ............. *G06F 21/32* (2013.01); *G06F 21/34* (2013.01)

(58) Field of Classification Search
CPC ................................. G06F 21/32; G06F 21/34
USPC .......................................................... 726/19
See application file for complete search history.

(56) References Cited

U.S. PATENT DOCUMENTS

| 2005/0270483 | A1 | 12/2005 | Fujimatsu et al. |
| 2013/0215275 | A1* | 8/2013 | Berini ............... G06V 10/993 |
| | | | 348/150 |
| 2019/0385395 | A1 | 12/2019 | Kunieda et al. |
| 2020/0169670 | A1 | 5/2020 | Nozue et al. |
| 2021/0374220 | A1 | 12/2021 | Ichikawa |
| 2023/0140496 | A1 | 5/2023 | Ichikawa |

FOREIGN PATENT DOCUMENTS

| JP | 2000331157 A | 11/2000 |
| JP | 2001034674 A | 2/2001 |
| JP | 2005025439 A | 1/2005 |
| JP | 2006155078 A | 6/2006 |
| JP | 2007004612 A | 1/2007 |

(Continued)

OTHER PUBLICATIONS

International Search Report of PCT Application No. PCT/JP2019/042754 mailed Dec. 17, 2019.

(Continued)

*Primary Examiner* — Anthony D Brown

(57) ABSTRACT

A facial authentication apparatus comprises: a camera arranged at a position capable of facing an authentication object person and captures a face image of the authentication object person; a display arranged below the camera and displays the face image captured by the camera; a card reader arranged below the display and on a front side as seen from the authentication object person, and reads a card presented by the authentication object person; and a wall member(s) arranged so as to extend to at least a front end portion of the card reader from an upper end portion of the display.

7 Claims, 15 Drawing Sheets

(56) References Cited

FOREIGN PATENT DOCUMENTS

| JP | 2008310481 A | 12/2008 |
| JP | 2015-036078 A | 2/2015 |
| JP | 2015082194 A | 4/2015 |
| JP | 2016053896 A | 4/2016 |
| JP | 2017-174183 A | 9/2017 |
| JP | 2017-182326 | 10/2017 |
| JP | 2018109935 A | 7/2018 |
| WO | 2017/159185 A1 | 9/2017 |
| WO | 2018061812 A1 | 4/2018 |

OTHER PUBLICATIONS

Shuichi Yuasa et al., "Biometric technology in practical use", OKI Technical Review, Jul. 1, 2006, vol. 73, No. 3. pp. 62-65.
Japanese Office Action for JP Application No. 2020-554035 mailed on Apr. 12, 2022 with English Translation.
JP Office Action for JP Application No. 2020-554035, mailed on Jun. 28, 2022 with English Translation.
US Office Action for U.S. Appl. No. 18/090,839, mailed on Aug. 15, 2023.
US Office Action for U.S. Appl. No. 17/286,637, mailed on Aug. 25, 2023.
JP Office Action for JP Application No. 2022-153619, mailed on Nov. 21, 2023 with English Translation.

\* cited by examiner

FIG. 8

| STATE | DISPLAY CONTENTS (REPRESENTATIONS) | LIGHT EMISSION PART LIGHTING PATTERN |
|---|---|---|
| AUTHENTICATION SUCCESS | GO | BLUE |
| AUTHENTICATION FAILURE | RETRY | YELLOW |
| NO CORRESPONDING DATA | ERROR | RED |

FIG. 12

| STATE | DISPLAY CONTENTS (REPRESENTATIONS) | LIGHT EMISSION PART LIGHTING PATTERN |
|---|---|---|
| FACIAL AUTHENTICATION SUCCESS | OK | YELLOW |
| AUTHORITY CONFIRMATION COMPLETION | GO | BLUE |
| FACIAL AUTHENTICATION FAILURE | RETRY | YELLOW TURN ON/OFF |
| NO AUTHORITY | STOP | RED |
| SYSTEM ANOMALY | WAIT | RED TURN ON/OFF |
| NO CORRESPONDING DATA | ERROR | RED |

FACIAL AUTHENTICATION APPARATUS AND CONTROL METHOD FOR FACIAL AUTHENTICATION APPARATUS

CROSS-REFERENCE TO RELATED APPLICATION

This application is a Continuation application of Ser. No. 17/286,637 filed on Apr. 19, 2021, which is a National Stage Entry of PCT/JP2019/042754 filed on Oct. 31, 2019, which claims priority from Japanese Patent Application 2018-206696 filed on Nov. 1, 2018, the contents of all of which are incorporated herein by reference, in their entirety.

FIELD

The present invention relates to a facial authentication apparatus and a control method for the facial authentication apparatus.

BACKGROUND

Patent Literature (PTL) 1 discloses a face comparison apparatus that may execute a sequential process including facial authentication that is executed upon identity verification. According to this literature, the face comparison apparatus executes a face comparison process in which a captured face data as a face image of an authentication object person or feature values of the face image is compared with a registered face data as a face image or feature values of the face image, which has/have been previously registered. In addition, the same literature discloses a configuration in which a display part and a mirror are arranged as an attention object and a camera is arranged near the attention object.

Patent Literature (PTL) 2 discloses a facial authentication apparatus in which a light adopted to an authentication object person, but not an excessively bright light, is emitted upon capturing a face image of the authentication object person so that pertinent face images may be efficiently obtained.

PTL 1: Tokkai JP2018-109935A
PTL 2: Tokkai JP2007-4612A

SUMMARY

The following analyses have been made by the present inventor. In the facial authentication apparatus of PTL 1 of a type in which a card is used in combination, a user interface is sometimes adopted, which displays a face image and an authentication result to an authentication object person in order to use a card of a different owner and to obtain a more pertinent face image (for example, paragraphs 0144, 0155 of PTL 1). However, the face comparison apparatus of PTL 1 has a configuration that only a partition panel is arranged in a booth, thus there is a problem that privacy is not protected under an environment where it is difficult to set up the booth.

Also, in Patent Literature 2, the displaying part is arranged on a front surface of the facial authentication apparatus, thus there is a possibility that a third party peeps the authentication result.

It is a purpose of the present invention to provide a facial authentication apparatus and a control method for the facial authentication apparatus which is compatible of both of ensuring throughput of the facial authentication apparatus of a type in which a card is used in combination and paying consideration on the authentication object person's privacy.

According to a first aspect, there is provided a facial authentication apparatus comprising a camera that is arranged at a position capable of facing an authentication object person and captures a face image of the authentication object person. The facial authentication apparatus further comprises a display that is arranged below the camera and displays the face image captured by the camera. The facial authentication apparatus further comprises a card reader that is arranged below the display and on a front side as seen from the authentication object person, and reads a card presented by the authentication object person. The facial authentication apparatus further comprises a wall member(s) that is (are) arranged so as to extend to at least a front end portion of the card reader from an upper end portion of the display.

According to a second aspect, there is provided a control method for a facial authentication apparatus which comprises: a camera that is arranged at a position capable of facing an authentication object person and captures a face image of the authentication object person; a display that is arranged below the camera and displays the face image captured by the camera; a card reader that is arranged below the display and on a front side as seen from the authentication object person, and reads a card presented by the authentication object person; a wall member(s) that is (are) arranged so as to extend to at least a front end portion of the card reader from an upper end portion of the display; and a light emission part that is arranged on an upper end portion of the wall member(s) and is capable of changing lighting patterns so that an authentication result may be identified. In the control method, first, the facial authentication apparatus executes: reading a card by the card reader so as to identify the authentication object person, and capturing a face image of the authentication object person by the camera. In addition, the facial authentication apparatus executes: comparing (collating) the face image captured by the camera with a face image of the authentication object person, which has been previously captured and identified by the card reader, comparing the face image captured by the camera with a face image of the authentication object person, which has been previously captured and identified by the card reader, and turning on the light emission part in a lighting pattern corresponding to a result of the comparison. The method is associated with a specific machine as the facial authentication apparatus which executes facial authentication using a face image which has been previously registered in an one-to-one manner.

According to the present invention, it is compatible of both of ensuring throughput of the facial authentication apparatus of a type in which a card is used in combination and giving consideration to the authentication object person's privacy. That is, the present invention provides ones that is obtained by transforming the facial authentication apparatus described in the Background to dramatically improve in both points of ensuring its throughput and giving consideration of the privacy.

BRIEF DESCRIPTION OF THE DRAWINGS

FIG. 8 is one example of display representation and light emission patterns of a light emission part in the facial authentication apparatus of the first example embodiment of the present invention.

FIG. 12 is an example of the display representation and the emission patterns of the light emission part in the facial authentication apparatus of a second example embodiment of the present invention.

PREFERRED MODES

Figure 1:
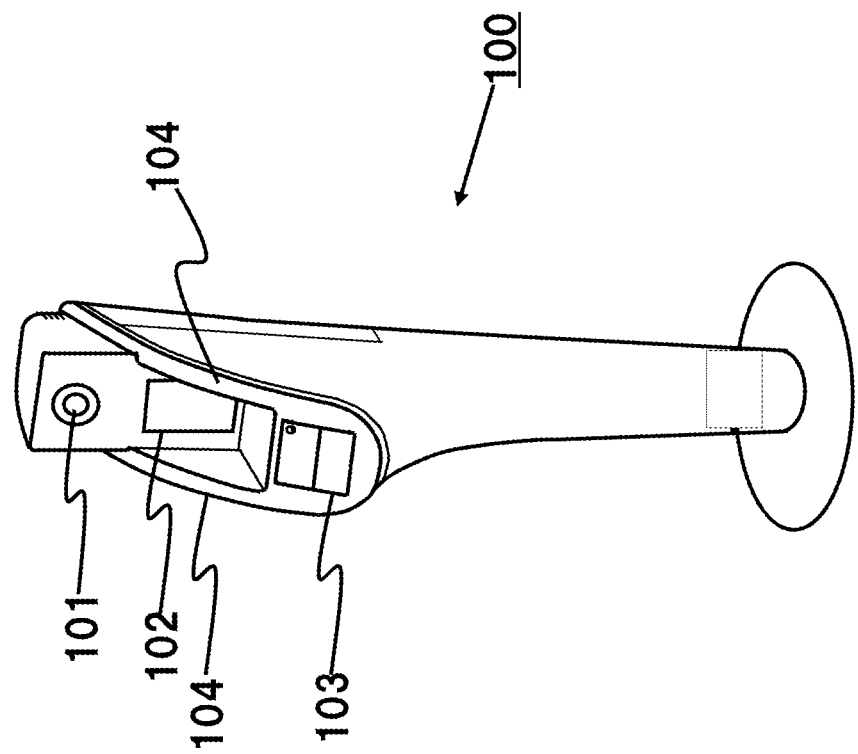
FIG. 1 is a diagram showing a facial authentication apparatus of one example embodiment of the present invention.

First, an outline of one example embodiment is explained while referring to FIG. 1. Herein, reference signs described in the outline is expediently appended to each element as one example for an aid for understanding. It is not intended that the outline provides any limitations of the present invention to the mode illustrated in the drawings. In addition, a connection line between blocks in each drawing and the like referred in the following example includes both of bidirectional and monodirectional connections. One-way arrow schematically indicates a main signal (data) flow, but not excluding bidirectional flows. Further, although omitted in the diagrams, a connection point of input/output of each block illustrated in the drawings comprises a port and an interface. A program is executed by a computer apparatus. The computer apparatus comprises, for example, a processor, a storage device, an input device, a communication interface and a display device, if required. In addition, the computer apparatus is configured to be capable of communicating with an internal or external apparatus (including a computer) via a communication interface irrespective of cable communication or radio communication. Further, in the following explanation, a phrase "A and/or B" is used for referring to any of "A or B" or "A and B".

One example embodiment of the present invention is realized by a facial authentication apparatus 100 comprising: a camera 101; a display 102 and a card reader 103, as illustrated in FIG. 1. More concretely, the camera 101 is arranged at a position capable of facing an authentication object person and captures a face image of the authentication object person. In addition, the display 102 is arranged below the camera 101. The card reader 103 is arranged below the display 102 and on a front side as seen from the authentication object person, and reads a card presented by the authentication object person. In addition, the facial authentication apparatus 100 comprises [a pair of] wall member(s) (partition member(s)) 104 that is/are arranged so as to extend to at least a front end portion of the card reader 103 from an upper end portion of the display 102.

Figure 2:
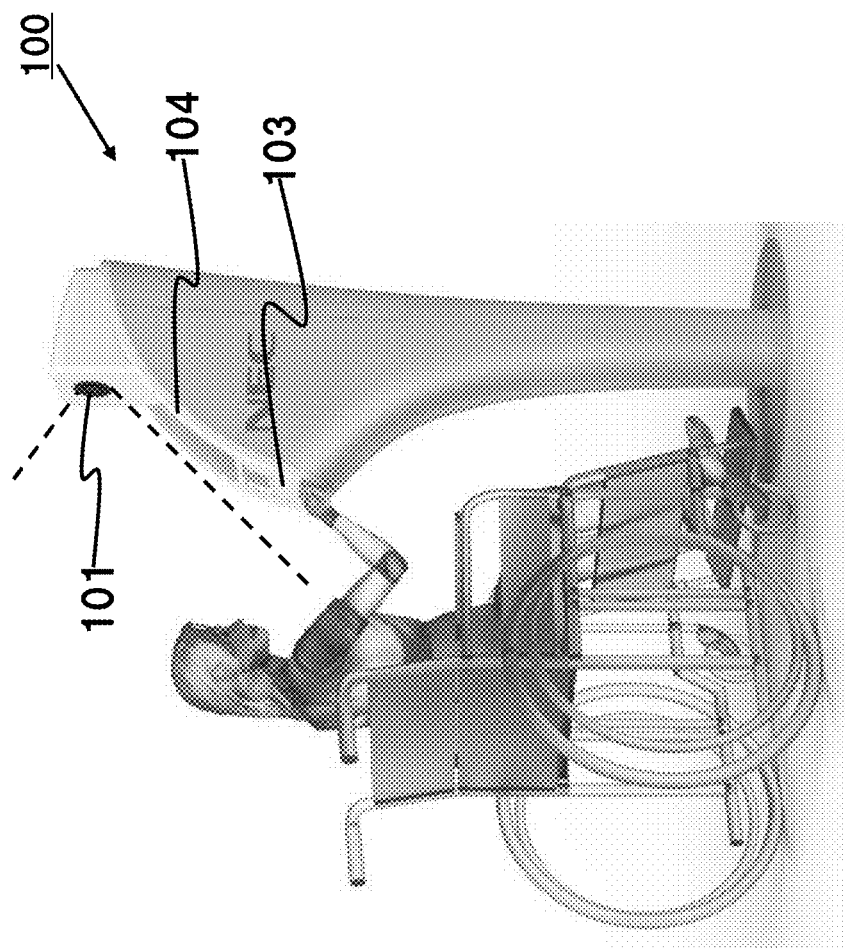
FIG. 2 is an explanatory view of a utilization mode of the facial authentication apparatus of one example embodiment of the present invention.

According to the facial authentication apparatus 100 having such configuration, as illustrated in FIG. 2, the wall member(s) 104 hides (shields) a face image and an authentication result displayed on the display 102 during a process of an authentication operation. Accordingly, the authentication object person may execute the operation in a relaxed state, thus throughput is improved, too.

Further, according to the configuration above, since the camera 101 is arranged on a back and upper side relative to the card reader 103, a person sitting on a wheelchair as illustrated in FIG. 2 and a child necessarily execute an operation for card reading at a position apart from the camera. By virtue of using a wide angle lens as a lens of the camera 101 (broken lines in FIG. 2 indicate an angle of view of the wide angle lens), a single camera may excellently capture a face image of not only, of course, a person who executes the operation in a standing state, but also the child and the person sitting on the wheelchair.

First Example Embodiment

Figure 3:
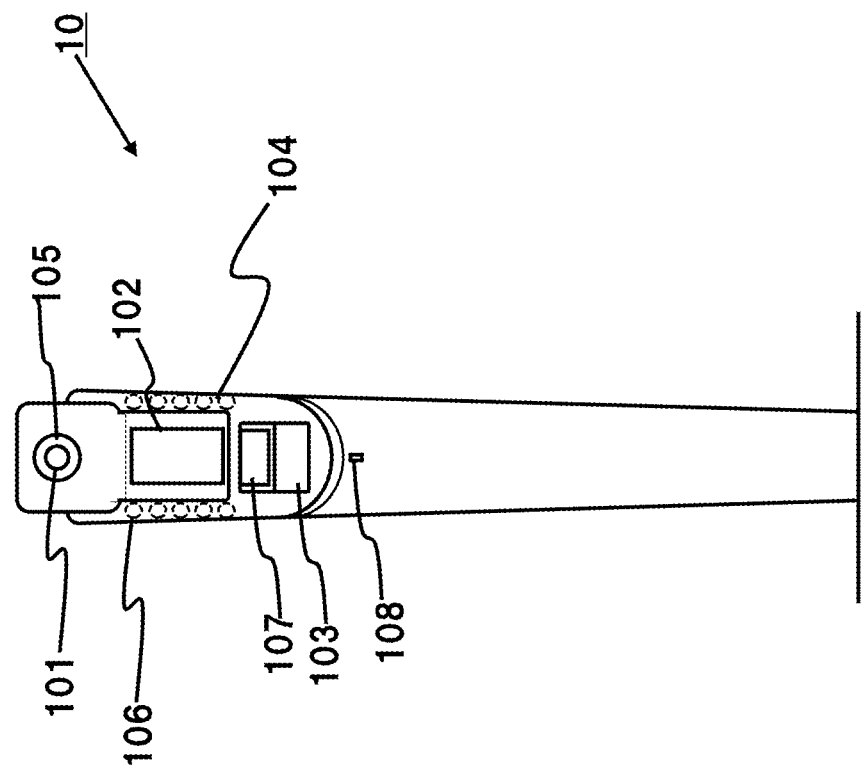
FIG. 3 is a front view of the facial authentication apparatus of a first example embodiment of the present invention.
Figure 4:
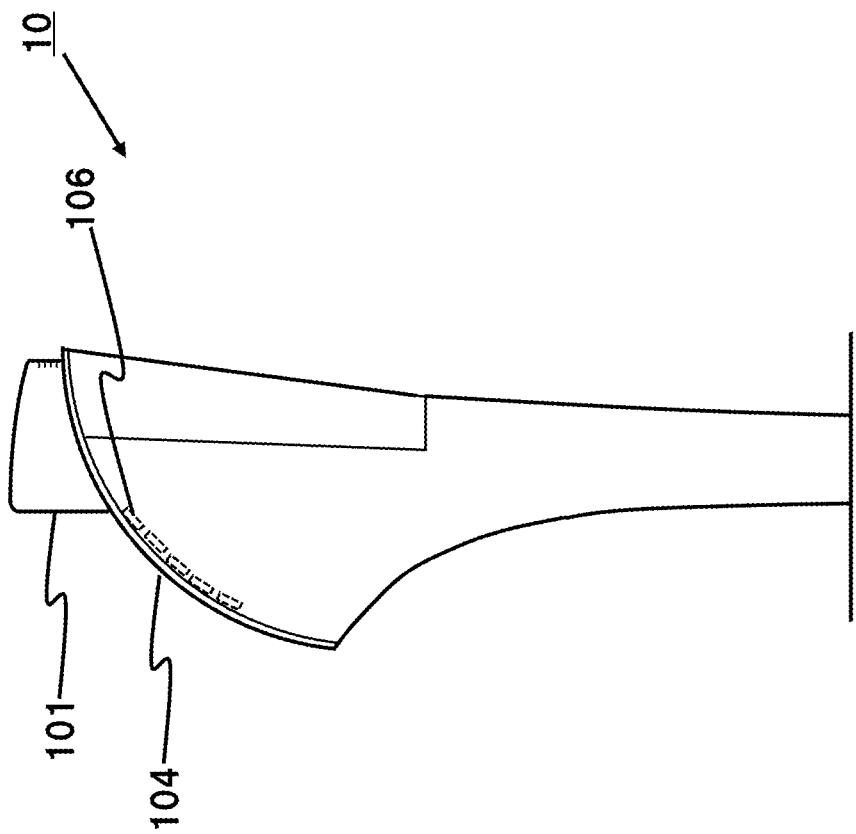
FIG. 4 is a side view of the facial authentication apparatus of the first example embodiment of the present invention.

Next, a first example embodiment is explained in detail while referring to drawings, in which the present invention is applied to gate control for an event venue and the like. FIGS. 3 and 4 are a front view and a side view of the facial authentication apparatus of the first example embodiment of the present invention. The facial authentication apparatus 100 of the first example embodiment of the present invention comprises the camera 101 on a top portion of a circular column housing.

The camera 101 is arranged in a direction along which a face of a person who is standing, sitting on a wheelchair, or has a low height may be captured, and captures a face image of an authentication object person. Of course, the camera 101 itself may have a tilt function and the like for changing the direction of the lens (inclination angle) so as to be adjusted to the face of the authentication object person.

A circular ring light (sightline guiding light) 105 is arranged on the periphery of the camera 101. The ring light (sightline guiding light) 105 is configured to be turned on when a human sensing sensor 108 arranged below the card reader 103 in the facial authentication apparatus 10 detects approach of a person. Although the ring light (sightline guiding light) 105 is for purpose of sightline guide, an LED unit having an intensity capable of being utilized as an auxiliary light source may be adopted in a case of dark environment.

The display 102 is configured to comprise a liquid crystal display apparatus and an organic EL (Electro-Luminescence) display and the like which are arranged below the camera so as to display a face image captured by the camera 101, a result of a facial authentication and the like.

The card reader 103 is arranged below the display 102 and on a front side as seen from the authentication object person, and reads an IC (Integrated Circuit) installed card, etc., presented by the authentication object person. In other words, the display 102 is positioned on the back and obliquely upper side of the card reader 103, and the camera 101 is arranged just above the display 102.

In the facial authentication apparatus 10 of the present example embodiment, a sub-display 107 is arranged on an upper stage of the card reader 103. The sub-display 107 displays a message for requesting card read operation and a card read result.

The facial authentication apparatus 10 of the present example embodiment, a human sensing sensor 108 is arranged below the card reader 103. An infrared ray sensor, etc., may be used as the human sensing sensor 108. For example, in a case where the human sensing sensor 108 detects approach of a human at a position where an excellent image may be obtained (for example, 2 m away from the camera), a face image suitable for comparison may be obtained when the camera 101 executes successive photographing. Herein, in the present example embodiment, the human sensing sensor 108 is used for turning on the ring light (sightline guiding light) 105, and the camera 101 itself continues photographing irrespective of a detection result of the human sensing sensor 108. Therefore, the human sensing sensor 108 itself may be omitted in a configuration in which the ring light (sightline guiding light) 105 is omitted and a configuration in which the ring light (sightline guiding light) 105 is always turned on.

In the facial authentication apparatus 10 of the present example embodiment, wall members 104 that are arranged so as to extend to a front end portion of the card reader 103 from an upper end portion of the display 102 on both sides of the front surface of the apparatus. At least upper surfaces of the wall members 104 are configured with a transparent member or a translucent member so as to function as a display part that displays an authentication result, etc., with LEDs 106 disposed inside thereof.

The LEDs (Light Emitting Diode) 106 are controlled by a control part (item 110 in FIG. 6) inside the facial authentication apparatus 10 so as to function as light emission parts that exhibit at least 3 states of authentication success, authentication failure and card read error. In the present example embodiment, the states are exhibited using LED units in which LEDs of 3 colors of blue, yellow, red are arranged.

Figure 5:
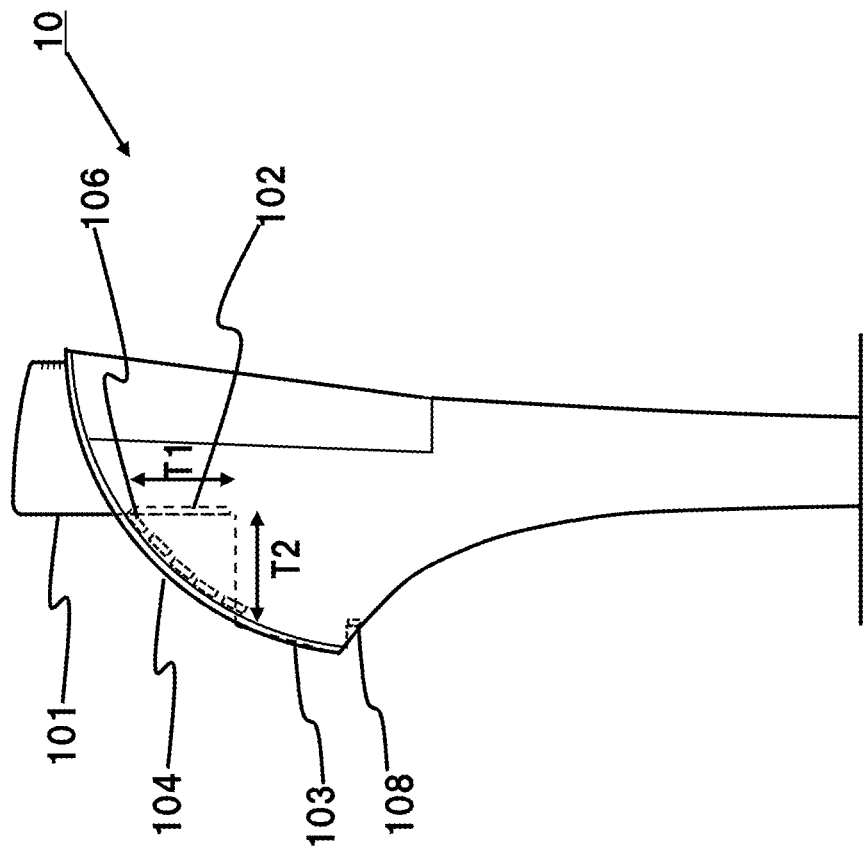
FIG. 5 is a partial perspective view for explanation of a positional relationship between a display and a card reader in the facial authentication apparatus of the first example embodiment of the present invention.

FIG. 5 is a partial perspective view for explanation of a positional relationship between the display and the card reader in the facial authentication apparatus of the first example embodiment of the present invention. The card reader 103 of the facial authentication apparatus 10 of the present example embodiment is arranged on a more front side than the surface of the display 102 by T2 which is longer than the height T1 of the display. In addition, the wall members 104 extend in an arcuate shape as seen from a side so as to cover the front end of the card reader 103 from a position higher than the upper end portion of the display 102. Thereby, a display surface of the display 102 may be hidden (shielded) from positions at a side(s) and obliquely backward of the display 102.

On the other hand, since the LEDs 106 are arranged on the upper end portion of the wall members 104, it is possible to confirm operation modes of the facial authentication apparatus 10.

Figure 6:
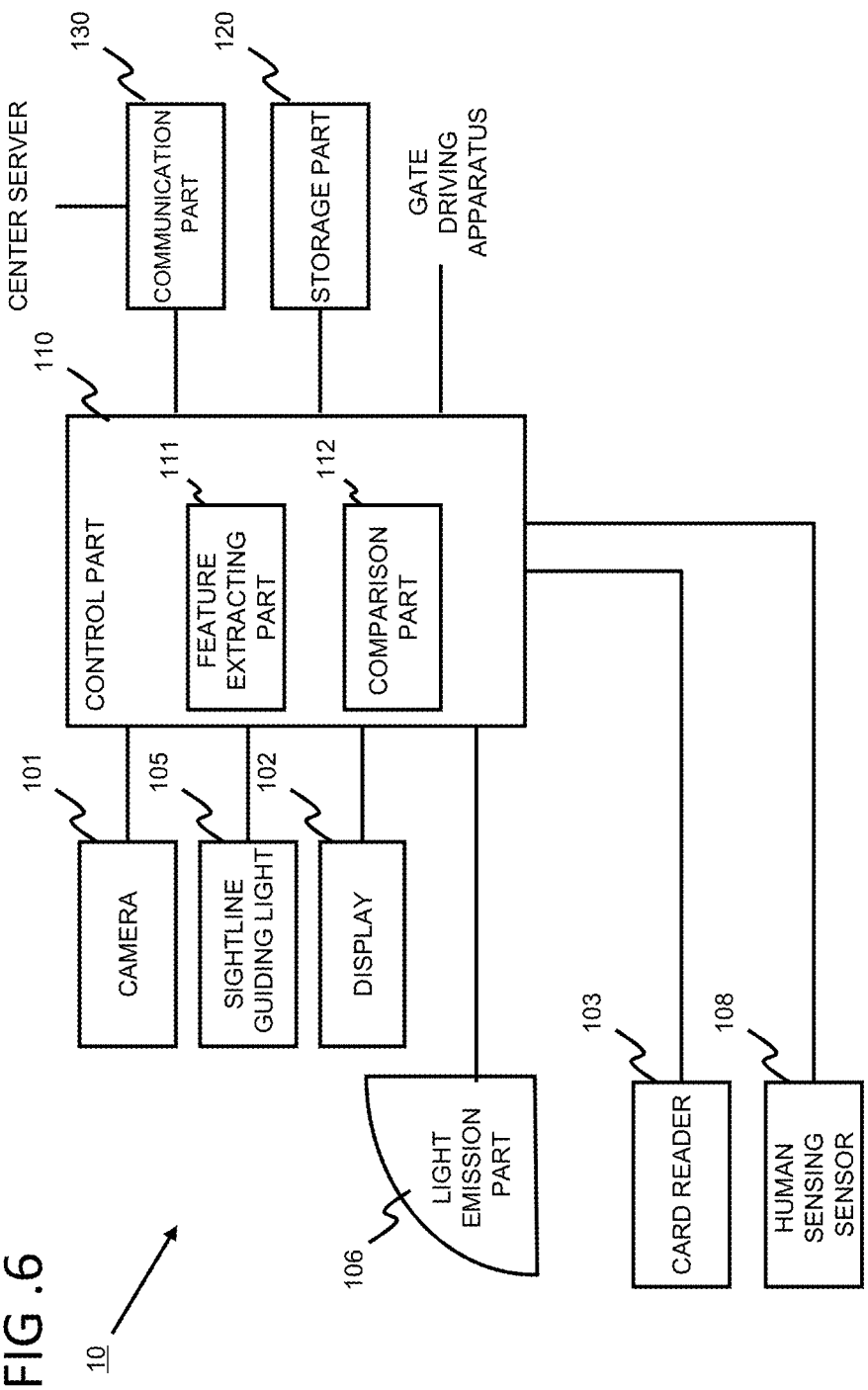
FIG. 6 is a functional block diagram illustrating a configuration of the facial authentication apparatus of the first example embodiment of the present invention.

Next, an inner configuration of the facial authentication apparatus 10 is explained. FIG. 6 is a functional block diagram illustrating a configuration of the facial authentication apparatus of the first example embodiment of the present invention. Referring to FIG. 6, a configuration is illustrated, in which the camera 101, the sightline guiding light 105, the display 102, the LEDs 106, the card reader 103, the human sensing sensor 108, a communication part 130 and a storage part 120 are connected to the control part 110.

The control part 110 comprises a feature extracting part 111 and a comparison part 112. The feature extracting part 111 extracts facial feature data of the authentication object person from face image data of the authentication object person which is captured by the camera 101.

The comparison part 112 compares (collates) the facial feature data of the authentication object person received from a center server via the communication part 130 with the feature data extracted by the feature extracting part 111. In addition, the comparison part 112 determines whether a person captured by the camera 101 is identical with a person read out by the card reader 103 by the comparison. In a case where the person captured by the camera 101 is identical with the person read out by the card reader as a result of the determination, the control part 110 operates a gate driving apparatus. In addition, the control part 110 controls display of the authentication result on the display 102 and light emission by the LED(s) 106 based on a result from card-reading by the card reader 103 and a result from the comparison by the comparison part 112.

The communication part 130 requests the facial feature data of the person read out from the card to the center server (omitted in the figures) that stores facial feature data of a group of authentication object persons, which have been previously registered. When receiving facial feature data of the designated person from the center server, then the communication part 130 transmits it to the control part 110.

The storage part 120 is used as a temporal storage section for the facial feature data of the person extracted by the feature extracting part 111 and the facial feature data of the person received from the center server. Such facial feature data(s) of the persons is/are deleted from the storage part 120 after completion of the comparison.

The other components are explained while referring to FIGS. 3 to 5, thus explanation thereof is omitted.

Figure 7:
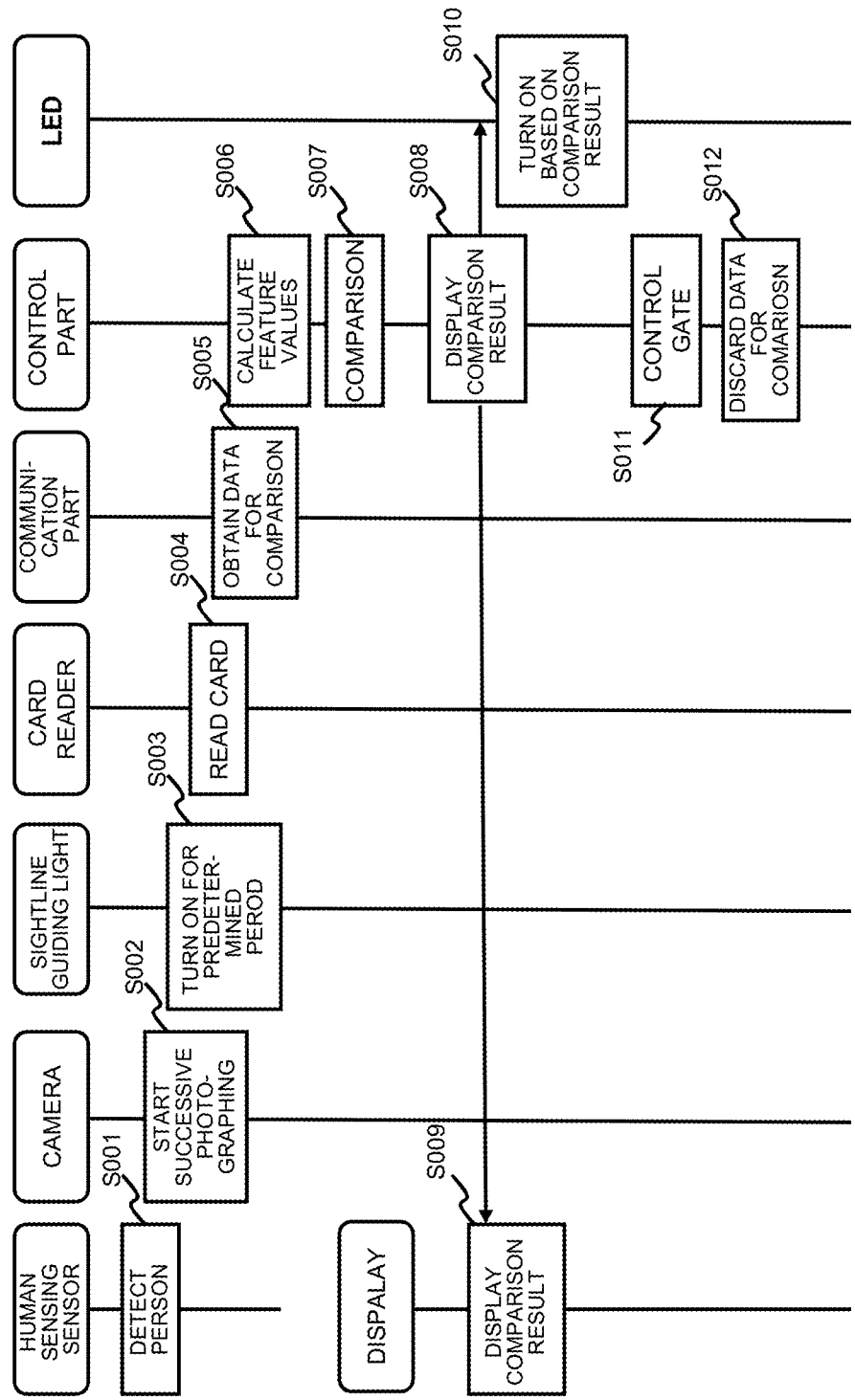
FIG. 7 is a sequence diagram illustrating operations executed by each of parts in the facial authentication apparatus of the first example embodiment of the present invention.

Next, operations by the facial authentication apparatus 10 of the first example embodiment are explained in detail while referring to the drawings. FIG. 7 is a sequence diagram illustrating operations in each of parts executed by the control part 110 of the facial authentication apparatus 10 of the first example embodiment of the present invention. Referring to FIG. 7, first, when the human sensing sensor 108 detects approach of a person (step S001), the control part 110 instructs the camera 101 to execute successive photographing (step S002).

In addition, the control part 110 turns on the sightline guiding light 105 so as to guide sightline of the authentication object person to a direction toward the camera 101 (step S003). Herein, steps S002 and S003 in FIG. 7 may be executed simultaneously or in a reverse order.

After that, when the authentication object person sets a card on the card reader 103, the card reader 103 reads the card so as to obtain card information including a personal ID of the authentication object person (step S004).

Next, the control part 110 obtains the facial feature data of the person corresponding to the personal ID read out by the card reader 103 from the center server via the communication part 130 (step S005).

Next, the control part 110 selects one or more face images of a condition suitable to the comparison from the face images captured by the camera 101 and calculates the feature values thereof so as to generate the feature data (step S006). Herein, as the conditions suitable to the comparison, face size in image, expression on face, consistency degree with photographing conditions at a time of the facial feature data has been previously registered, and the like may be selected to be set. In addition, it is possible to adopt a method of selecting a face image with a face image selection algorithm, so called as the best shot image.

Next, the control part 110 compares the facial feature data obtained from the center server with the feature data calculated in step S006 so as to determine whether or not the person captured by the camera 101 is identical with the person identified from the card (step S007).

Next, the control part 110 displays a message corresponding to the determination result on the display 102. Similarly, the control part 110 turns on the LEDs 106 in a lighting patterns based on the determination result (step S008 to S010).

FIG. 8 illustrates one example of combination of display contents (modes) and lighting patterns corresponding to the determination result in steps S008 to S010. In the example of FIG. 8, for example, in a case of success in authentication (determined as the identical person), the control part 110 displays a message denoting "GO" on the display 102 and turns on the LEDs 106 in blue. Thereby, the authentication object person judges that authentication of himself is completed, and enters a gate. In addition, a staff around the facial authentication apparatus 10 may recognize that the authentication has been executed without any problem, by virtue that the LEDs is turned on in blue.

Figure 9:
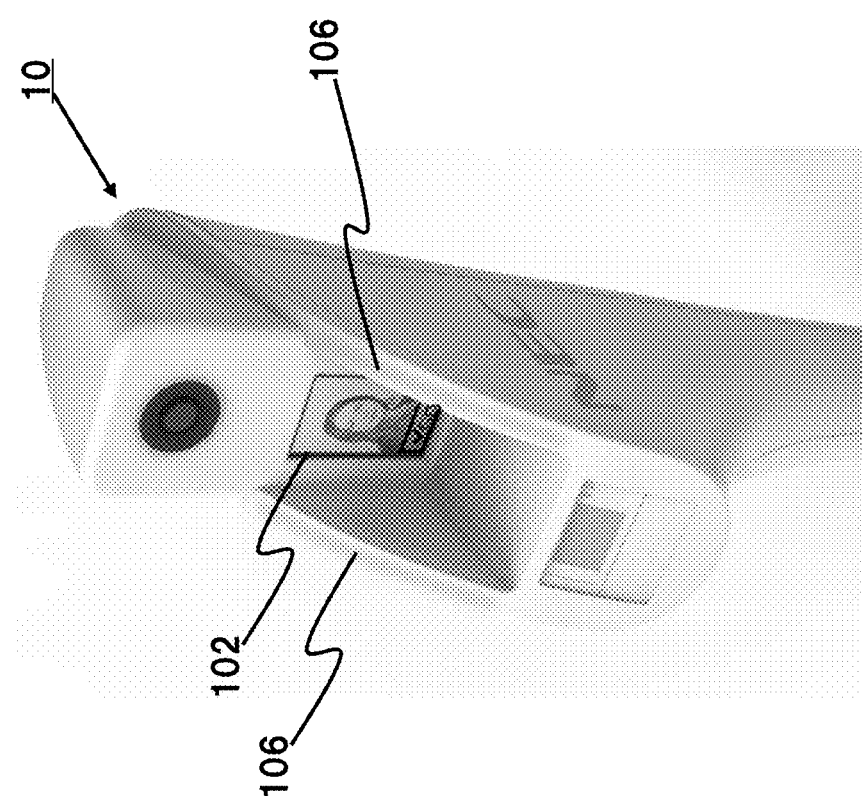
FIG. 9 is a diagram showing a display representation and a light emission pattern of the light emission part in a case of authentication success in the facial authentication apparatus of the first example embodiment of the present invention.

FIG. 9 is an explanatory view of operations by the facial authentication apparatus 10 in a case of success in authentication (determined as the identical person). In the example in FIG. 9, the display 102 displays a face image succeeded in the authentication (determined as the identical person) and a character "V GO" below thereof. In addition, the upper end portions of the wall members 104 on both sides of the display 102 emit blue light by the LEDs 106, 106. In the example in FIG. 9, although the display surface of the display 102 may be seen as it is seen from the back (of the person) and obliquely upward, the authentication object person's privacy is usually protected because the wall members 104 hide (shield) the display surface of the display 102.

Again, referring to FIG. 8, in a case of failure in the authentication (determined as not the identical person), the control part 110 displays a message "RETRY" on the display 102 and turns on the LEDs 106 in yellow. Thereby, the authentication object person may recognize that authentication of himself results in failure and take an action to be photographed according to a guidance by the display 102 and the sub-display 107. In addition, also a staff standing around the facial authentication apparatus 10 may recognize that the authentication for the authentication object person resulted in failure by virtue that LEDs are turned on in yellow.

Further, occurrence of a case is prospected, where feature data corresponding to the personal information on the card read by the card reader 103 cannot be obtained based on reasons, such as preliminary registration of the face image has not been completed, and the like. In such case, the control part 110 displays a message "ERROR" on the display 102 and turns on the LEDs 106 in red. Thereby, the authentication object person may recognize that the card has a problem, and take actions, such as seeking another card, making inquiries to a staff, and the like. In addition, also the staff standing around the facial authentication apparatus 10 may recognize that the card of the authentication object person has problem by virtue of red-LEDs, and make actions, such as giving a talk, and the like.

Similar to the example in FIG. 9, the authentication object person's privacy is protected in these cases since the wall members 104 hide the display surface of the display 102.

Next, the control part 110 transmits instruction for opening and closing to the gate driving apparatus based on the result determined in step S007 (step S011). After that, the control part 110 discards feature data used in the comparison (step S012). Thereby, it is prevented that unnecessary personal information is accumulated in the facial authentication apparatus 10.

In addition, in the above example embodiment, the facial authentication apparatus 10 may have a function of detecting duplicated entrances based on whether or not there is duplication in card information or the like obtained from the center server. In this case, it is preferable that the control part 110 also executes operations, such as displaying a message denoting "ERROR" on the display 102, turning on the LEDs 106 in red, and the like. In addition, detection of the duplicated entrances may be executed on the center server side. In this case, it is preferable that the control part 110 also executes operations, such as displaying a message denoting "ERROR" on the display 102, turning on the LEDs 106 in red, and the like.

As explained above, according to the facial authentication apparatus 10 of the present example embodiment, it is compatible of both of ensuring throughput of the facial authentication apparatus of a type where a card is used in combination and paying consideration on the authentication object person's privacy. The reason thereof resides in that a configuration is adopted, having a face image capturing function of an excellent efficacy in which operations by the human sensing sensor 108, the camera 101, the sightline guiding light 105, etc., are associated each other, and a protect function of the personal information and the authentication result by the wall members 104.

Herein, in the above example embodiment, it is explained that the facial feature data of a person is obtained in step S005 and then the feature values of the image captured by the camera 101 so as to generate the feature data. However, the calculation of the feature values of the image captured by the camera 101 may be executed in advance. For example, after start of the photographing in steps S002 to S003, the control part 110 may select a face image having a condition suitable for the comparison, calculate the feature values thereof, and generate the feature data. Thereby, also throughput may be more improved.

Second Example Embodiment

Next, a second example embodiment is explained, in which open and close of the gate is controlled using an authority card previously set, besides the personal identification card. The configuration of the facial authentication apparatus in the second example embodiment may be realized by almost the same configuration as that of the first example embodiment, thus mainly difference therebetween is explained.

Figure 10:
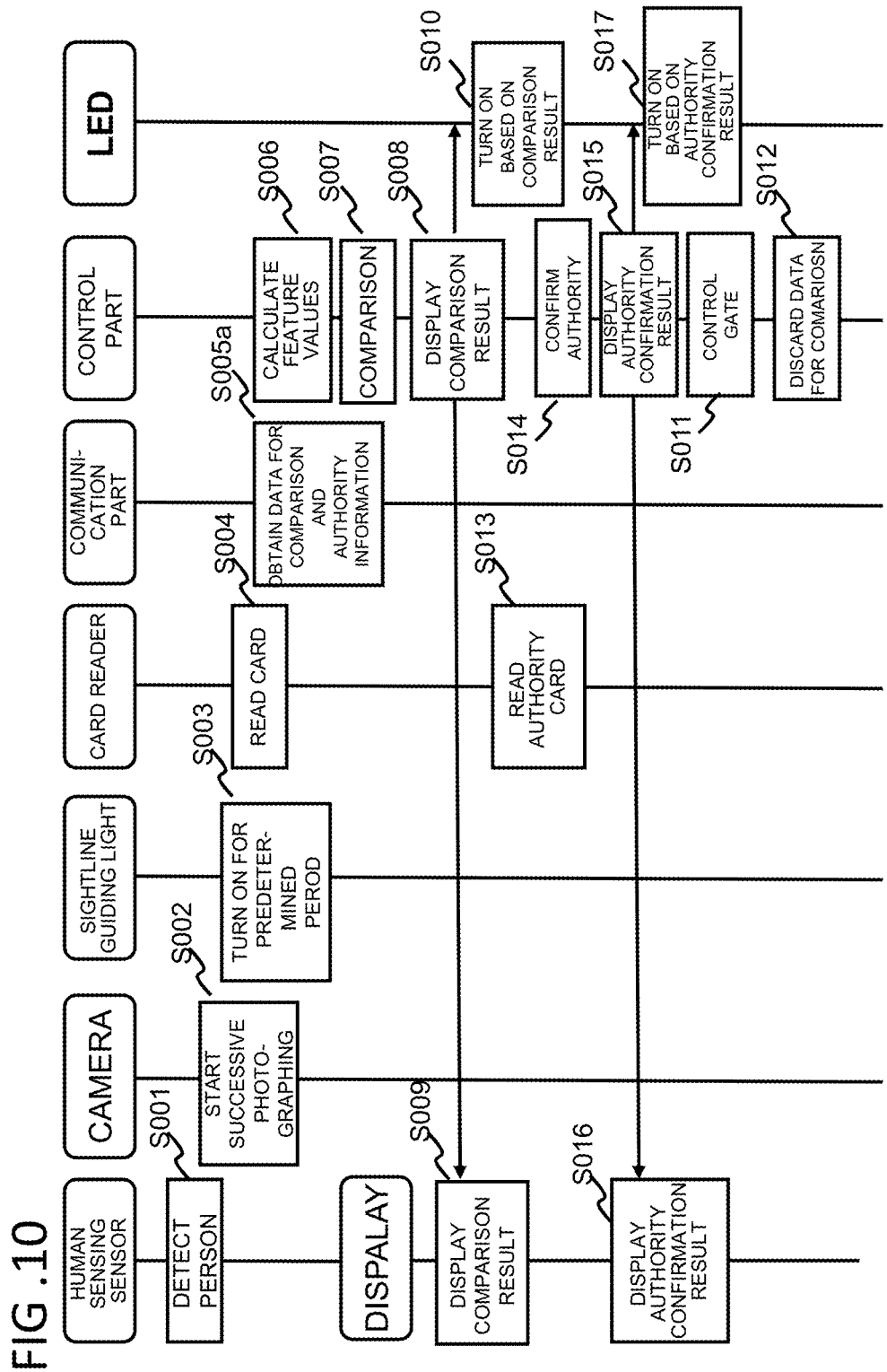
FIG. 10 is a sequence diagram illustrating operations executed by each of parts in a facial authentication apparatus of a second example embodiment of the present invention.

FIG. 10 is a sequence diagram illustrating operations executed by each of parts in the facial authentication apparatus of the second example embodiment of the present invention. Difference from the sequence diagram of the first example embodiment illustrated in FIG. 7 resides in that presentation of the authority card is requested after the facial authentication so as to confirm whether or not the authentication object person has a pertinent authority.

In addition, in the facial authentication apparatus of the second example embodiment, in step S005a of FIG. 10, authority information assigned to a corresponding person is obtained in addition to the facial feature data. The authority information includes information indicating whether, or not, the corresponding person has authority of entering the gate controlled by the facial authentication apparatus.

Figure 11:
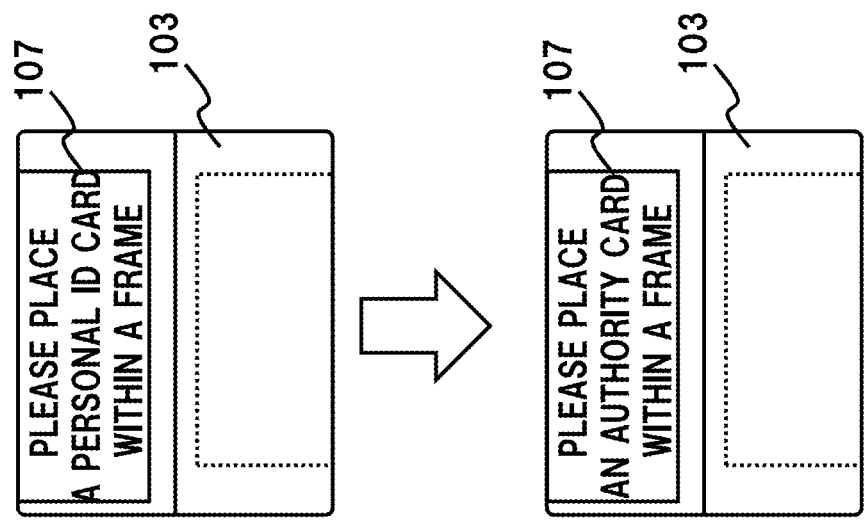
FIG. 11 is a diagram showing an example of message displayed on a sub-display in the facial authentication apparatus of a second example embodiment of the present invention.

In addition, as indicated in steps S013 to S017 in FIG. 10, in the second example embodiment, an authority card is read after facial authentication using the personal identification card (personal ID card) (step S013). FIG. 11 is a diagram showing an example of message displayed on the sub-display 107 in step S004 and step S013.

In addition, in the facial authentication apparatus of the second example embodiment, in step S014 in FIG. 10, it is determined whether, or not, the authentication object person who has been determined as identical with the person identified from the card has a lawful entrance authority.

Next, the control part 110 displays a message based on authority confirmation result on the display 102. Similarly, the control part 110 turns on the LEDs 106 in a lighting pattern corresponding to the authority confirmation result (steps S015 to S017).

FIG. 12 shows an example of combinations of the display contents and the lighting patterns depending on the determination results in steps S008 to S010 and steps S015 to S017 in FIG. 10. In the example in FIG. 12, for example, at a time point of success in the authentication of step S007 (determined as the identical person), the control part 110 displays a message denoting "OK" on the display 102 and turns on the LEDs 106 in yellow. Thereby, the authentication object person judges that the authentication of himself is completed and will take an action of reading the authority card by the card reader 103. In addition, the staff standing around the facial authentication apparatus 10 may also recognize that the authentication is executed without any problem by virtue of yellow LEDs.

After that, for example, at a time point of success in authority confirmation in step S014 (determined as having authority), the control part 110 displays a message denoting "GO" on the display 102 and turns on the LEDs 106 in blue. Thereby, the authentication object person may judge that authority confirmation of himself is completed, and go to the gate. In addition, the staff standing around the facial authentication apparatus 10 may also recognize that the authority confirmation is executed without any problem by virtue of blue LEDs.

Further, in the present example embodiment, even if a problem occurs in respective cases of the authentication in step S007 and the authority confirmation in step S014, the authentication object person and the staff may also comprehend respective states from the display representation on the display 102 and the lighting patterns of the LEDs (see FIG. 12). For example, in a case of failure in authentication in step S007, it results in the state of the [FACIAL] AUTHENTICATION FAILURE in FIG. 12. In such case, the control part 110 displays character "RETRY" on the display 102 and turns on and off the LEDs 106 in yellow. In addition, for example, in a case of determination as out of authority range in the authority confirmation in step S014, it results in NO AUTHORITY state in FIG. 12. In such case, the control part 110 displays character "STOP" on the display 102 and turns on and off the LEDs 106 in red.

Similarly, in a case where it is detected that a system has an anomaly due to any causes, it results in SYSTEM ANOMALY state in FIG. 12. In such case, the control part 110 displays a character "WAIT" on the display 102 and turns on and off the LEDs 106 in red. In addition, similar to the first example embodiment, in a case where the feature data corresponding to the personal information on the card cannot be obtained, and the like, it is possible to display a character "ERROR" on the display 102 and turns the LEDs 106 in red. Herein, in this case, although the lighting mode of the LEDs 106 is the same as those of no authority state in FIG. 12, lighting patterns of the LEDs 106 may be changed, if necessary. For example, a mode may be adopted in either one case, such that the lighting is executed in another color, and the light is turned on/off at a higher speed than a usual case.

As explained above, according to the present example embodiment, it is possible to execute control of open and close of the gate in combination of the personal ID card and the authority card, and to notify of an operation mode thereof using the display 102 and the LEDs 106. Thereby, it is possible to execute a detailed control such that a certain person A is allowed to pass through a gate x and a gate y during period a, and, after elapse of the period a, the person A is allowed to pass through the gate x, but not allowed to pass through the gate y, and the like.

Third Example Embodiment

Figure 13:
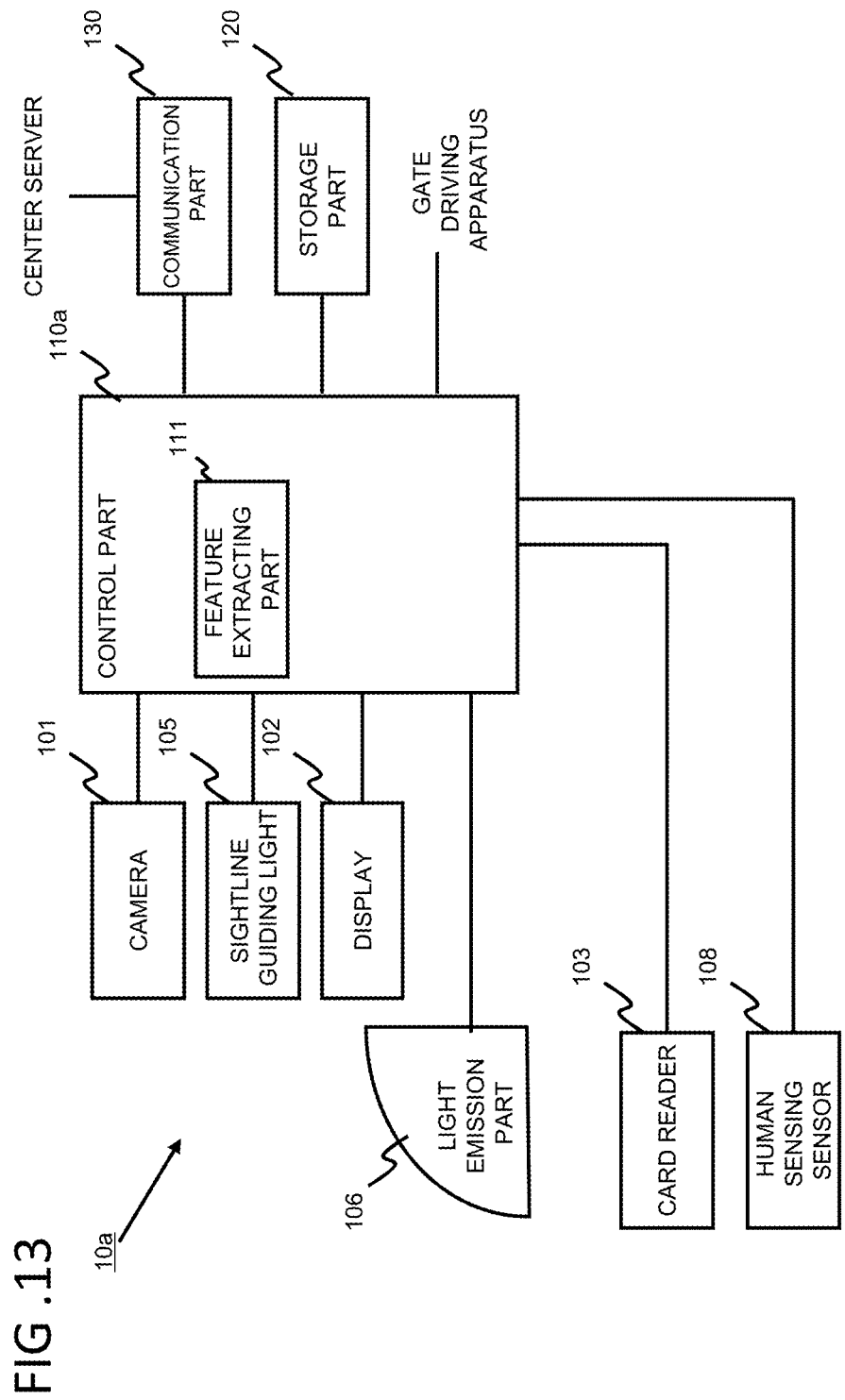
FIG. 13 is a functional block diagram illustrating a configuration of a facial authentication apparatus of a third example embodiment of the present invention.

In the above first and second example embodiments, it is explained that the comparison process is executed on the side of the facial authentication apparatus 10. However, a configuration that the comparison process is executed on the side of the center server may be also adopted. In such case, as illustrated in FIG. 13, the comparison part of the control part 110a in the facial authentication apparatus 10a is to be omitted. In addition, the facial authentication apparatus 10a transmits the facial feature data to the center server side, receives a comparison result, and controls the display 102 and the LEDs 106, respectively.

According to such third example embodiment, there is an advantage that it is not required to transmit the facial feature data of a person stored on the center server side to the facial authentication apparatus 10a. Thereby, there is an advantage that the facial feature data of the person would not be stolen even if the facial authentication apparatus 10a receives any attack.

As stated above, although each of the example embodiments of the present invention is explained, the present invention is not limited to the above example embodiments, and any further modification, substitution and adjustment may be applied within a scope of a basic technical concept of the present invention. For example, the network configuration, the configuration of each element, and the expression mode of the message illustrated in each drawing are an example of explanatory aid for understanding the present invention, thus not limited to the configuration(s) illustrated in these drawings.

Figure 14B:
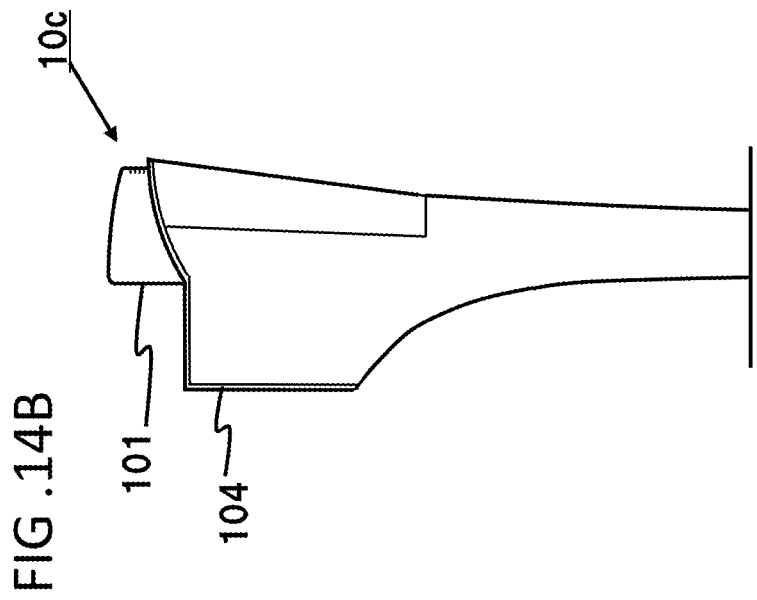
FIGS. 14A and 14B are a diagram showing an example of a variation configuration of a wall member of the present invention, respectively.
Figure 14A:
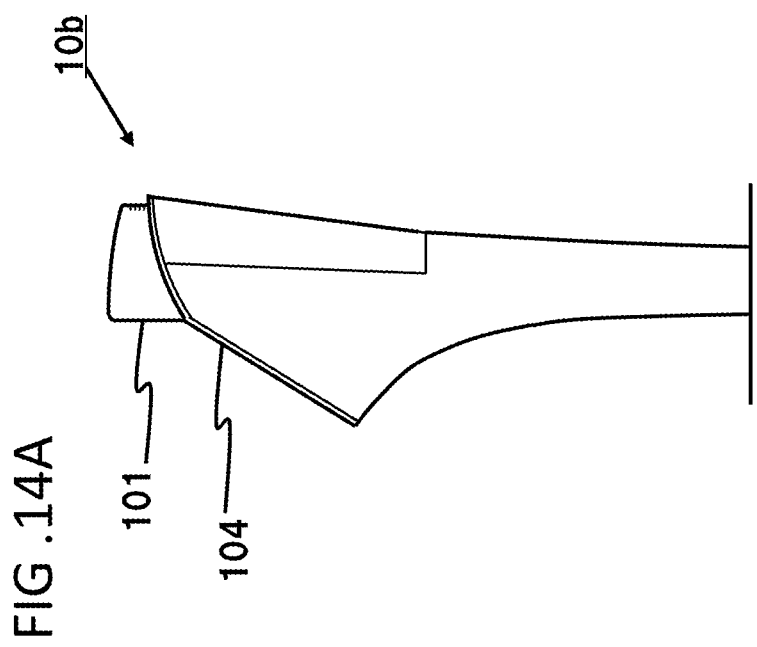

For example, in the above example embodiments, explained is an example where the wall members 104 are formed in an arcuate shape when seen from a side. However, the configuration of the wall members 104 is not limited to such configuration. For example, as illustrated in FIG. 14A, the wall members 104 may be formed in a straight contour as seen from a side. Even in such case, it is also assumed that the wall members are arranged so as to extend to the front end portion of the card reader from an upper end portion of the display. In addition, for example, as illustrated in FIG. 14B, the wall members 104 may be formed in a square shape (a screen shape) as seen from a side. Even in such case, it is also assumed that the wall members 104 are arranged so as to extend to the front end portion of the card reader from an upper end portion of the display. The configuration of the wall members 104 is not limited thereto, and a configuration in which they protrude toward a side of the user over (exceeding) a virtual line extending from the upper end portion of the display to the front end portion of the card reader. These configurations may be pertinently selected to be adopted.

For example, in the above example embodiments, it is explained that the facial authentication apparatus 10 obtains the facial feature data of a person from the center server. However, in a case where the facial feature data of the person is stored in the card itself, the comparison may be also executed with such facial feature data of the person. In such case, there is an advantage that the facial authentication apparatus 10 is not necessary to be connected to a network.

In addition, in the above example embodiments, it is explained to use a ring light surrounding the peripheral part of the lens of the camera 101 as the sightline guiding light 105. However, the configuration of the sightline guiding light 105 is not limited to such configuration. For example, a configuration may be adopted, in which a point light source or a small display is arranged near the lens of the camera 101.

In addition, in the above example embodiments, it is explained that the LEDs 106 are arranged on the upper end portion of the wall members 104 so as to function as the light emission part. However, the configuration of the light emission part is not limited to such configuration. For example, a configuration may be adopted, in which a LED(s) and a rotary light are arranged independently from the wall members 104 so as to function as a light emission part capable of changing the lighting patterns such that the authentication result may be identified.

In addition, in the above example embodiments, a utility is explained in which the facial authentication apparatus controls the gate. However, the facial authentication apparatus of the present invention may be applied to a case other than the gate control. For example, it may be applied to an attendance management of employees in a company, and a check-in system in a hotel, and the like.

Figure 15:
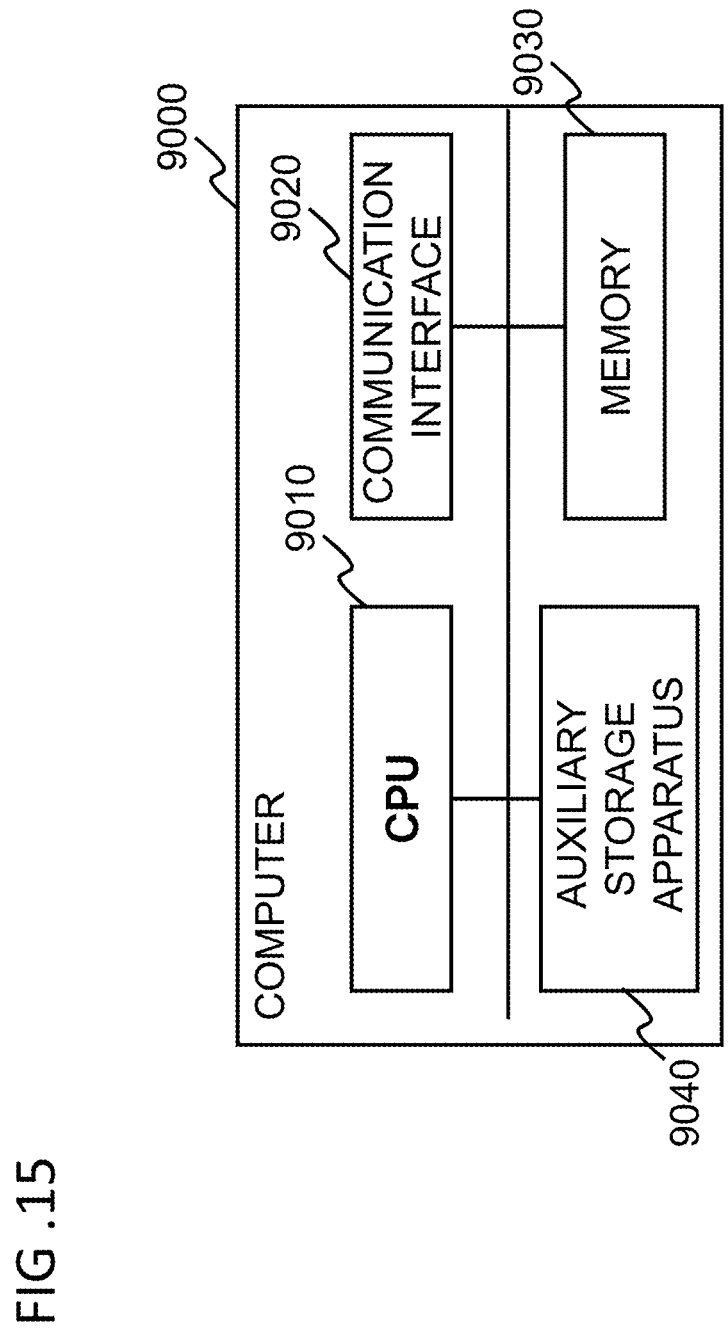
FIG. 15 is a diagram showing a configuration of a computer installed in the facial authentication apparatus of the present invention.

In addition, the operations described in the above first to third example embodiments may be realized by a program that causes a computer (9000 in FIG. 15) that functions as the control part 110 in the facial authentication apparatus to implement the function as the control part 110. Such computer is exemplified by a configuration comprising: a CPU (Central Processing Unit) 9010; a communication interface 9020; a memory 9030; and an auxiliary storage apparatus 9040 as illustrated in FIG. 15. That is, the CPU 9010 in FIG. 15 may execute a control program for each part of the apparatus, a facial authentication program, etc. so as to update each calculation parameter stored in the auxiliary storage apparatus 9040, etc.

That is, each part (processing means, function) of the facial authentication apparatus described in the above first to third example embodiments may be realized by a computer program that causes a processor mounted on the facial authentication apparatus to execute each process described above with a hardware thereof.

Last, preferred modes of the present invention are summarized.

First Mode (see the facial authentication apparatus according to the above first aspect)

Second Mode

It is preferable that the above facial authentication apparatus comprises a light emission part that is arranged on an upper end portion of the wall member(s) and is capable of changing lighting patterns so that an authentication result may be identified.

Third Mode

It is preferable that the light emission part of the above facial authentication apparatus is configured to be exhibitable of at least 3 states of authentication success, authentication failure and card read error.

Fourth Mode

It is preferable that the card reader of the above facial authentication apparatus is positioned so that a front end of the card reader is positioned on the front side by a height T1 or more of a surface of the display.

Fifth Mode

It is preferable that the above facial authentication apparatus further comprises
a sightline guiding light arranged near a lens surface of the camera, and a human sensing sensor that turns on the sightline guiding light when it detects approach of the authentication object person, and wherein the facial authentication apparatus executes capturing operation in association with light emission of the sightline guiding light.

Sixth Mode

The above facial authentication apparatus may further comprise a comparison part that compares the face image captured by the camera with a face image of the authentication object person, which has been previously captured and identified by the card reader.

Seventh Mode

The above facial authentication apparatus may adopt a configuration in which it transmits, to a predetermined center server, facial feature data calculated from the face image captured by the camera and receives a result of facial authentication from the center server.

Eighth Mode

It is preferable that the upper end portion of the wall member(s) of the above facial authentication apparatus formed in an arcuate shape as seen from a side.

Ninth Mode (see the control method for the facial authentication apparatus according to the second aspect)

Herein, the disclosures of the above Patent Literatures are incorporated herein by reference thereto. Variations and adjustments of the example embodiments are possible within the ambit of the entire disclosure (including the claims) of the present invention and based on the basic technical concept of the present invention. Various combinations and selections (including non-selection) of various disclosed elements (including each element in each claim, each example embodiment, each drawing, etc.) are possible within the ambit of the disclosure of the present invention. Namely, the present invention of course includes various variations and modifications that could be made by those skilled in the art according to the overall disclosure including the claims and the technical concept. Particularly, a numerical value range described in the present description should be interpreted as describing arbitrary numerical values or small ranges included in the ranges, even if they are not described explicitly. Further, each of the disclosed matters of the above cited literatures is regarded as included in the described matters in the present application, if required, on the basis of the concept of the present invention, as a part of description of the present invention, also that a part or entire thereof is used in combination with a described matter(s) in the present application.

REFERENCE SIGNS LIST 10, 10a, 10b, 10c, 100 facial authentication apparatus
101 camera
102 display
103 card reader
104 wall member(s)
105 sightline guiding light
106 LED(s) (light emission part)
107 sub-display
108 human sensing sensor
110, 110a control part
111 feature extracting part
112 comparison part
120 storage part
130 communication part
9000 computer
9010 CPU
9020 communication interface
9030 memory
9040 auxiliary storage apparatus

The invention claimed is:
1. A facial authentication apparatus, comprising:
a display;
a camera that is arranged above the display and captures a face image of a target person of authentication being a person sitting on a wheelchair;
a card reader that reads a card presented by the target person of authentication, wherein the card reader is arranged at a position below and in front of the display as seen from the target person of authentication, and the position is at a distance from the display longer than a height of the display; and
a pair of wall members extending from both sides of the display to a front side as seen from the person sitting on the wheelchair so as to secure a space that allows the person sitting on the wheelchair to access the facial authentication apparatus, wherein the pair of wall members comprises lower ends disposed at a level higher than legs of the person sitting on the wheelchair,
wherein the pair of wall members extend in such a fashion that shields a display surface of the display from a third party standing on a side or a position obliquely behind the target person of authentication, and
the pair of wall members are arranged in front of the display and sides of a space above the card reader such that the pair of wall members extend in an arcuate shape from an upper end of the display to a front end of the card reader.

2. The facial authentication apparatus according to claim 1, wherein the display is arranged at a level capable of facing a face of the person sitting on the wheelchair.

3. The facial authentication apparatus according to claim 1, wherein the pair of wall members extend from both the sides of the display until an angle of view of the camera.

4. The facial authentication apparatus according to claim 1, wherein the camera comprises a wide angle lens.

5. The facial authentication apparatus according to claim 1, wherein the camera has a tilt function.

6. The facial authentication apparatus according to claim 1, wherein the
card reader is arranged below the pair of wall members on a front side thereof as seen from the person sitting on the wheelchair.

7. The facial authentication apparatus according to claim 1, wherein the card reader is arranged along an angle of view of the camera.

* * * * *